Patented Feb. 2, 1954

2,668,098

UNITED STATES PATENT OFFICE 2,668,098

GELLING NORMALLY LIQUID HYDROCARBONS

Robert M. Alm, Highland, Ind., assignor to Standard Oil Company, Chicago, Ill., a corporation of Indiana No Drawing. Application November 18, 1950, Serial No. 196,530

8 Claims. (Cl. 44—7)

This invention relates to improvements in the preparation and use of solidified normally liquid hydrocarbons. More particularly, the invention pertains to improved hydrocarbon gel compositions for use as hydraulic fracturing media in producing channels in earth formations to increase the productivity of fluids from strata traversed by an oil or gas well.

Gelled hydrocarbon liquids are of course known in the prior art but such gels have employed difficult compounding conditions or could not be formulated from liquid hydrocarbons of wide boiling range by simple stirring or mixing of a gelling agent at ambient temperatures. Previous attempts to provide such a versatile gelling agent for use in the presence of low-boiling normally liquid hydrocarbons have therefore not been entirely successful. Accordingly, it is a primary object of my invention to provide a gelling agent which is effective at ambient or ordinary temperatures and which can be incorporated into normally liquid hydrocarbons by simple mixing or stirring to produce a stable gel or solid fuel.

A specific object of the invention is to provide a gelled hydrocarbon liquid which can be resolved to a highly fluid state by simple and positive means. A further object of my invention is to provide a gelled hydrocarbon which is adapted to withstand shipment without breakdown. An additional object is to provide a gelled flammable hydrocarbon which does not melt during burning with consequent fire danger and improper combustion. Another object is to provide a gelled hydrocarbon which is adhesive and sufficiently cohesive to be used as an incendiary.

A gelled hydrocarbon of the type to which this invention relates is useful in the hydraulic fracturing of a formation traversed by a well. Recently a process has been developed for hydraulic fracturing of selective formations to produce channels therein by pumping a viscous liquid into the well and applying pressure to the liquid which is subsequently removed preliminary to producing the well. Such a process is described, for example, in the Oil and Gas Journal, vol. 47, No. 24, page 76 et seq. (October 14, 1948). In such a process it is important that the hydraulic fluid does not penetrate into the formation too rapidly because this would preclude attaining the necessary fracturing pressure. However, merely providing a viscous liquid is not sufficient, since it is necessary to remove the hydraulic fluid from the fracture before producing the well. If it is too viscous and stable a gel it tends to remain in the fracture and plug the producing formation. Accordingly, it is the object of this invention to provide a hydraulic liquid which will not flow freely into the formation but which can nevertheless be reduced in viscosity under controlled conditions.

A further object is to provide a gelled hydrocarbon liquid, the gel characteristics of which will be stable for several hours but which will resolve to a liquid phase upon continuing contact with the well formation.

An additional object of the invention is to provide a gelling agent for low viscosity hydrocarbon liquids which will produce a gel that is stable with respect to fluid loss when under pressure. The foregoing and other objects of the invention will become apparent as my description thereof proceeds.

In general the body agent of this invention comprises salts of aliphatic xanthates for use as hydrocarbon gelling agents. This gelling agent is comprised of the metal salts of an aliphatic xanthate of the structure:

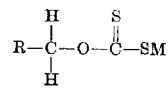

in which R is a branched alkyl group of 12 to 24 carbon atoms and M is a metal of group I, II, III or IV of the periodic table, preferably an alkali metal or aluminum. I have found that the metal salts of alkyl xanthates, where R is a polymethyl alkyl group of 12 to 24 carbon atoms, such as is produced by the oxo process, are particularly effective as gelling agents. As examples of these I may use sodium and potassium tridecyl xanthate.

The polymethyl primary alcohols used in my invention can be derived from polymethyl olefins such as branched-chain propylene and butylene polymers produced by polymerization with an acid-type catalyst; the polymers and copolymers being oxoated, i. e. reacted with CO and $H_2$ over a cobalt catalyst, to produce aldehydes of increased carbon chain length which are hydrogenated in the same or a separate step to the branched alcohols. Another source of the polymethyl olefins for oxoation is the $C_{12}$–$C_{24}$ olefin product of hydrocarbon synthesis from CO and $H_2$ over an iron catalyst.

The gelling agents which form the basis of my invention may be prepared by a number of procedures from the polymethyl alcohol. One method of preparation is to react the selected alcoholate, such as potassium tridecylate, directly with carbon disulfide. Another method of preparation would be to react a polymethyl alcohol having at least 12 carbon atoms to the molecule with carbon disulfide and an alkali metal hydroxide to form the metal xanthate having the polymethyl alkyl group. It is also contemplated that single metal xanthates may be derived from a single polymethyl alcohol or from mixed alcohols. Furthermore, salts of mixed metals may be employed with single or mixed polymethyl alcohols. Likewise, it is contemplated that xanthates produced from secondary and tertiary aliphatic alcohols having polymethyl groups of 12 to 24 carbon atoms may be used to produce the gelling agent, according to my invention. However, my invention is not directed to the method of preparing these xanthate salts from the polymethyl alcohol and these methods are given for the purpose of example only, since the metal xanthates coming within my invention can be prepared by any of the known methods.

The normally liquid organic materials which may be solidified, according to my invention, include petroleum hydrocarbons such as naphthas, gasoline, kerosene, fuel oil distillates, and pure hydrocarbons such as benzene, toluene and xylene, and higher boiling hydrocarbon fractions which contain substantial proportions of relatively low-boiling hydrocarbons which are dispersants for the gelling agent. Thus certain crude oils containing lighter petroleum fractions can be gelled.

Between about 0.5 and about 10 weight percent, preferably between about 3 and 5 weight percent, of the metal polymethyl xanthate produces the desired gel. Gelation begins immediately when stirred at ambient temperatures of between about 30 and 100° F. and the peak gelation is reached in about 30 to about 60 minutes depending on the degree of agitation. The lower limit of the temperature is governed by the solubility of the xanthate in the particular liquid hydrocarbon and the upper limit is set by the boiling point of the hydrocarbon.

The potassium xanthates derived from the defined branched-chain or polymethyl alcohols are the best gelling agents, although the corresponding sodium salts can be used in larger proportions to produce satisfactory gels. Ordinarily between about 1 and 5 weight percent of the potassium salt and between about 5 and 10 weight percent of the sodium salt are adequate.

The metal xanthates identified in the table have been derived from oxo alcohols as indicated, and have been successfully employed in gelling gasoline by simple mixing of about 2.0 percent of the xanthate with the gasoline at room temperature. The nonyl alcohol derivative from oxo codimer alcohol ($C_9H_{19}OCS_2K$) was not effective as a gelling agent.

*Table*

Potassium tridecyl xanthate, $C_{13}H_{27}OCS_2K$, from oxo propylene tetramer alcohol.
Potassium tetradecyl xanthate, $C_{14}H_{27}OCS_2K$, from oxo alcohol produced from $C_{13}HCS$ olefin.
Potassium heptadecyl xanthate, $C_{17}H_{35}OCS_2K$, from oxo alcohol produced from $C_{16}HCS$ olefin.
Sodium tridecyl xanthate, $C_{13}H_{27}OCS_2Na$, from oxo propylene tetramer alcohol.

As specific examples of the above I have taken 3 parts potassium tridecyl xanthate and 50 parts benzene and formed a suspension by vigorous stirring. To this was added 50 parts naphtha at room temperature. The material set at once into a stable gel. Heating the gel on a steam bath served to clarify it but did not in any way impair its unique properties as a solid.

My invention is further illustrated by an additional example wherein one part of potassium tridecyl xanthate was stirred vigorously with 20 parts of xylene. To this suspension was added 80 parts naphtha and as in the preceding example a stable gel was formed immediately.

Xanthates of alcohols having branched structures with polymethyl groups are effective for producing a satisfactory xanthate salt which has the desired gelling properties. Straight-chain xanthate salts such as potassium hexadecyl xanthate and potassium n-tetradecyl xanthate were tried and these would not gel hydrocarbons by the usual procedure of simple stirring at room temperature. It was found, however, that if the hexadecyl derivative and naphtha were sealed in a Pyrex tube and heated to 130° C. or higher for an hour and then rapidly cooled, a gel would be formed. Such gels, however, are difficult to prepare and are inferior to those made from the branched-chain derivatives by simple stirring at moderate temperature. Also, more of the straight-chain xanthate is required to make a gel of comparable consistency than when the xanthate is a polymethyl alcohol derivative.

I have found that heavier hydrocarbon fractions such as Winkler No. 10 oil cannot be gelled by the simple stirring of the xanthate gelling agent into a quantity of the oil. However, a 50–50 mixture of such oil and naphtha can be gelled. It is therefore contemplated that a mutual dispersant for the xanthate and for the organic liquid to be gelled may be used. Thus the gelling agent can be dispersed in a liquid such as benzene and the thickened dispersion added to another quantity of a less readily gelled organic liquid for the gelation thereof.

The gels formed as described herein are stable to heat but can be broken, as for example when it is desired to revert a solid fuel to a liquid, by mixing 3 to 5 percent water with the gel. Separate liquid phases are produced with the xanthate dissolved in the liquid water. If the gel is merely brought into contact with water, the gel will break in 2 to 15 hours and produce the liquid phases. Thus, although the produced gel is stable at relatively high temperatures and small amounts of water, its gel-like characteristics can be selectively reduced or destroyed when it is desired to regain the liquid hydrocarbon.

Gels produced according to my invention may be used as solid fuels and lubricants, as military incendiaries, and a hydraulic fluids. However, to illustrate the utility of my invention, I will describe it in conjunction with a method and means for hydraulically fracturing well formations.

In a typical operation, the zone or formation of the well to be treated is isolated by one or more packers which may be of a mechanical or hydraulic inflatable type. Hydraulic fracturing fluid consisting of, for example, gasoline which has been gelled by the addition of a metal xanthate is pumped into the isolated zone and pressure applied to the fluid.

The gelling can be developed in the well. Therefore, since the more viscous gels are difficult to pump, the xanthate and hydrocarbon liquid can be introduced separately into the well by means of a flow-type mixer. The liquid and xanthate gelling agent gel rapidly while being pumped through the tubing and attain the desired viscosity en route to the formation to be fractured. Pressure on the gel may be applied immediately to the formation or the gel may be allowed to stand in the well until the maximum gelation has developed.

Both viscosity and filter rate are indicative of the ability of the fracturing fluid to resist penetration of the formation prior to the fracturing thereof. In general, with a given gel the viscosity is reduced by the temperature of the formation and this should be taken into consideration when selecting the gel characteristics. Formation temperatures may ordinarily range from about 100 to about 210° F., the average temperature usually being in the range of about 140° F. Such temperature conditions normally require gels having bodying agents incorporated therein to the extent of between about 0.5 and 10 weight percent. I have found that a 5 weight percent potassium tridecyl xanthate gel of naphtha remains stable after one-half hour's heating at 212° F. which is more severe than the average well condition.

If desired, the gelled fluid may contain a solid fracture propping agent so that once a fracture is formed in the formation its closing is prevented by the propping agent and a channel which is permeable to the well fluid is produced. Suitable propping agents are materials such as plaster sand or other finely divided props having a particle size of about 16 mesh. Between about 0.5 and about 10 pounds of such propping agent can be added to each gallon of viscous gel.

Whether the gel contains props or not, when it is placed opposite the formation it tends to stay within the well and upon continued pumping of a fluid into the well high pressure is built up due to the gel's inability to penetrate the formation at a rapid rate. Sufficient pressure, e. g. 1000 to about 3000 p. s. i. or as high as 15,000 p. s. i. is applied to the gelled fluid within the well until the "formation breakdown pressure" is reached. Ordinarily this breakdown pressure is equal in pounds per square inch to about 0.8 times the depth of the formation in feet. The following liquid may be ungelled gasoline, crude oil, or water separated from the gel by a gel protecting quantity of liquid which may be a mutual solvent for the gel and water.

When the formation breakdown pressure has been exceeded, the surface pressure decreases abruptly and indicates that the fracture has been produced. The gel may then be broken in situ by treatment with a gel breaker such as 3% to 5% water which reduces the gel viscosity and causes the hydrocarbon portion of the gel to become a liquid which can be readily withdrawn from the formation. Where sufficient time is available the connate water of a formation is sufficient to cause the gel to break over a period of two to ten hours in contact with the connate water. Ordinarily, however, it may be preferred to destroy the gel properties by positive injection of an aqueous medium into the fractured formation.

Although I have described my invention in terms of specific examples which are set forth in considerable detail, it should be understood that these are by way of illustration only and that the invention is not limited thereto, since alternative embodiments and operating techniques will become apparent to those skilled in the art in view of my disclosure. Accordingly, modifications of my invention are contemplated without departing from the spirit of the described invention or the scope of the appended claims.

What I claim is:

1. A gelled hydrocarbon comprising a normally liquid hydrocarbon and between about 0.5 and about 10 weight percent of a metal salt of an aliphatic xanthate of the structure

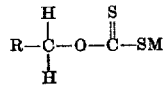

wherein R is a branched alkyl group of from 12 to 24 carbon atoms and M is a metal selected from Groups I, II, III and IV of the periodic table.

2. The gelled hydrocarbon of claim 1 in which the salt is potassium tridecyl xanthate.

3. A gelled liquid hydrocarbon of high viscosity which comprises a volatile liquid hydrocarbon and between about 0.5 and 10.0 weight percent of a gelling agent consisting essentially of a salt of an aliphatic xanthate having a polymethyl alkyl group containing between about 12 and 25 carbon atoms.

4. An improved hydrocarbon gel comprising gasoline and a gelling proportion of a metal salt of an aliphatic xanthate, the alkyl radical of which is a branched group containing between about 12 and 25 carbon atoms.

5. An improved hydrocarbon gel comprising a petroleum fraction predominating in constituents boiling below about 400° F. and an amount of an alkyl metal salt of an aliphatic xanthate sufficient to gel said fraction, the alkyl radical of the xanthate being a polymethyl group containing between about 12 and 25 carbon atoms.

6. The method of solidifying a normally liquid inflammable hydrocarbon which comprises adding to such liquid hydrocarbon a polymethyl aliphatic xanthate salt of an alkali metal in an amount sufficient to solidify the liquid hydrocarbon, and stirring said normally liquid hydrocarbon and aliphatic xanthate salt to form a stable gel, said polymethyl aliphatic xanthate having an alkyl group containing between about 12 and 25 carbon atoms.

7. The method of gelling a normally liquid hydrocarbon which comprises adding to such hydrocarbon between about 0.5 and 10 weight percent potassium tridecyl xanthate, and stirring the resultant mixture at ambient temperature until a gel of the desired characteristics is obtained.

8. The method of claim 7 wherein the hydrocarbon is a naphtha and about 5 weight percent potassium tridecyl xanthate is used.

ROBERT M. ALM.

References Cited in the file of this patent

UNITED STATES PATENTS

| Number | Name | Date |
|---|---|---|
| 1,848,568 | Klinkenstein | Mar. 8, 1932 |
| 2,335,017 | McNab et al. | Nov. 23, 1943 |
| 2,354,570 | Benckenstein | July 25, 1944 |
| 2,363,884 | McCleary et al. | Nov. 28, 1944 |
| 2,436,589 | McDermott | Feb. 24, 1948 |
| 2,547,778 | Reistle | Apr. 3, 1951 |
| 2,553,568 | Finkelstein | May 22, 1951 |

OTHER REFERENCES

Hassebroek: Applications and Results of the Hydrafrac Process, article in World Oil, February 1, 1951, Production Section, pages 133–136, 138 and 148.